United States Patent [19]  [11] 4,185,878
Robert  [45] Jan. 29, 1980

[54] HYDROSTATIC BEARING FOR A ROTATING SHAFT

[75] Inventor: Bernard L. Robert, St. Germain en Laye, France

[73] Assignee: Regie Nationale des Usines Renault, Boulogne-Billancourt, France

[21] Appl. No.: 904,894

[22] Filed: May 11, 1978

[30] Foreign Application Priority Data

May 13, 1977 [FR] France ................. 77 14746

[51] Int. Cl.² ........................................... F16C 17/16
[52] U.S. Cl. ........................................ 308/9; 308/122
[58] Field of Search ............... 308/9, DIG. 2, DIG. 1, 308/122

[56] References Cited

U.S. PATENT DOCUMENTS

| 3,271,086 | 9/1966 | Deffrenne | 308/122 X |
| 3,685,874 | 8/1972 | Gerard | 308/9 |
| 3,785,708 | 1/1974 | Miyasaki | 308/9 |

Primary Examiner—Douglas C. Butler
Attorney, Agent, or Firm—Oblon, Fisher, Spivak, McClelland & Maier

[57] ABSTRACT

A rotating-shaft hydrostatic bearing of the type comprising a support circuit including opposed support chambers around the shaft receiving fluid under pressure and having a constant leakage with respect to the shaft, a radial position detection circuit for the shaft in the bearing including opposed detection chambers around the shaft receiving fluid under pressure and having a constant leakage with respect to the shaft, a device for servoing the shaft in position activated by the detection circuit and acting on the support circuit, the servoing device comprising a distributor with mobile element adapted to supply the opposed support chambers by the intermediary of constrictions varying in the inverse sense on one side or the other of its equilibrium position, the mobile distributor element being integral in motion with a mobile corrector element subjected to the opposed actions of the fluid pressure prevailing in the opposed chambers of the detection circuit. The mobile annular element of the distributor is surrounded by a second annular element forming with it chambers connected to the detection chambers and delimiting the opposed zones, this second annular element itself being subjected at its periphery and in the same angular orientation as that of the detection chambers to the opposed action of fluid-throttling pressures which correspond, on the one hand, to detection circuit leaks and, on the other to leakage of an equilibration fluid circuit for the normal position of the shaft in its bearing.

4 Claims, 2 Drawing Figures

HYDROSTATIC BEARING FOR A ROTATING SHAFT

BACKGROUND OF THE INVENTION

The present invention relates to a hydrostatic bearing of a rotating shaft, such bearings being utilized notably on machine tools, for boring or grinding spindles, for example.

There are three types of such bearings:

(a) simple hydrostatic bearings supplied with supporting fluid via fixed restrictions.

(b) "pressure-servoed" hydrostatic bearings, supplied via restrictions which vary as a function of the changes in pressure prevailing in the bearing support chambers.

(c) "position-servoed" hydrostatic bearings, supplied via restrictions which vary as a function of variations in position of the shaft with respect to a fixed reference, in a detection system tied to the bearing.

It is to the last type that the invention relates.

The aim of using such a technique is to obtain, when the shaft is subjected to a radial load, a minimal, if not zero, displacement of the former with respect to the bearing.

One can describe the rotating-shaft hydrostatic bearing of the type considered as comprising a support circuit including opposed support chambers around the said shaft receiving fluid under pressure and having a constant leakage with respect to the shaft, a radial position detection circuit for the shaft in the bearing including opposed detection chambers around the shaft receiving fluid under pressure and having a constant leakage with respect to the shaft, means of servoing the shaft in position activated by the detection circuit and acting on the support circuit, the said servoing means comprising a distributor with mobile element adapted to supply the opposed support chambers by the intermediary of constrictions varying in the inverse sense on one side or the other of its equilibrium position, the said mobile distributor element being integral in motion with a mobile corrector element subjected to the opposed actions of the fluid pressure prevailing in the opposed chambers of the detection circuit.

The known servoing means are not integrated in the bearing and involve the use of communicating passages which render the overall system complex and bulky.

SUMMARY OF THE INVENTION

The present invention offers a solution which first of all, eliminates this drawback and which is essentially characterized by the fact that the mobile distributor element is in the form of an annular element surrounding the supply passages to the support chambers and forming with them the aforesaid constrictions, this annular element furthermore being subjected at opposite zones of its periphery with angular position corresponding to that of the said detection chambers, to the fluid pressures prevailing in the latter.

In addition, the invention offers the advantage of lending itself readily to providing position servoing not only in a definite radial direction, but omnidirectionally, by simple recourse to the use, in combination with detection circuits in two different radial directions, of pressure chambers and zones correspondingly distributed around the said mobile annular distributor element, i.e. without duplication of such an element as would be the case with the known arrangements with the usual separated distributor.

It will also be noted that the invention readily allows supply of the hydrostatic bearing assembly from a single source of pressure and with a single fluid, which is not the case in the known solutions of the type considered, where the detection circuit and part of the servo circuit are pneumatic.

Moreover, with a view to obtaining a regulation with good dynamic behavior and free of hunting in particular, the hydrostatic bearing of the invention is likewise characterized by the fact that the said mobile annular element of the distributor is surrounded by a second annular element forming with it chambers connected to the aforementioned detection chambers and delimiting the aforesaid opposed zones, this second annular element itself being subjected at its periphery and in the same angular orientation as that of the detection chambers to the opposed action of fluid-throttling pressures which correspond, on the one hand, to detection circuit leaks and, on the other to leakage of an equilibration fluid circuit for the normal position of the shaft in its bearing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
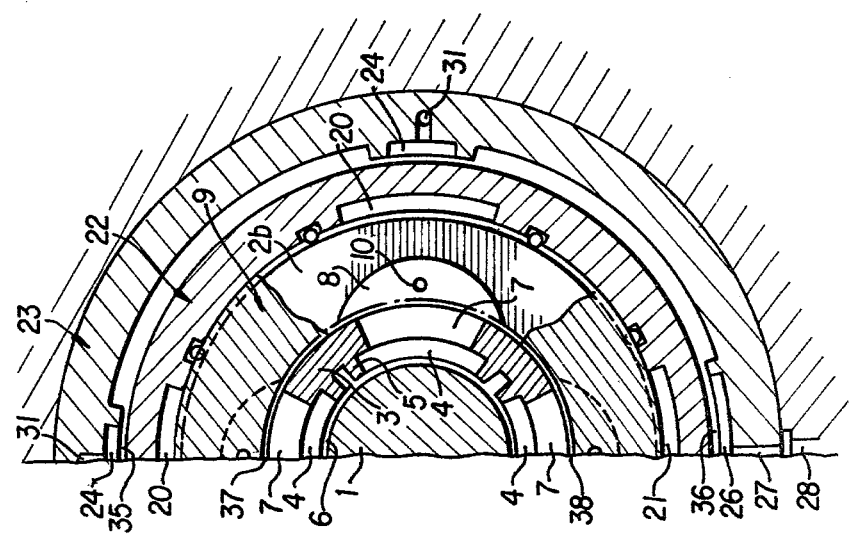
FIG. 2 is a half of a transverse section of the hydrostatic bearing along the line II—II of FIG. 1.
Figure 1:
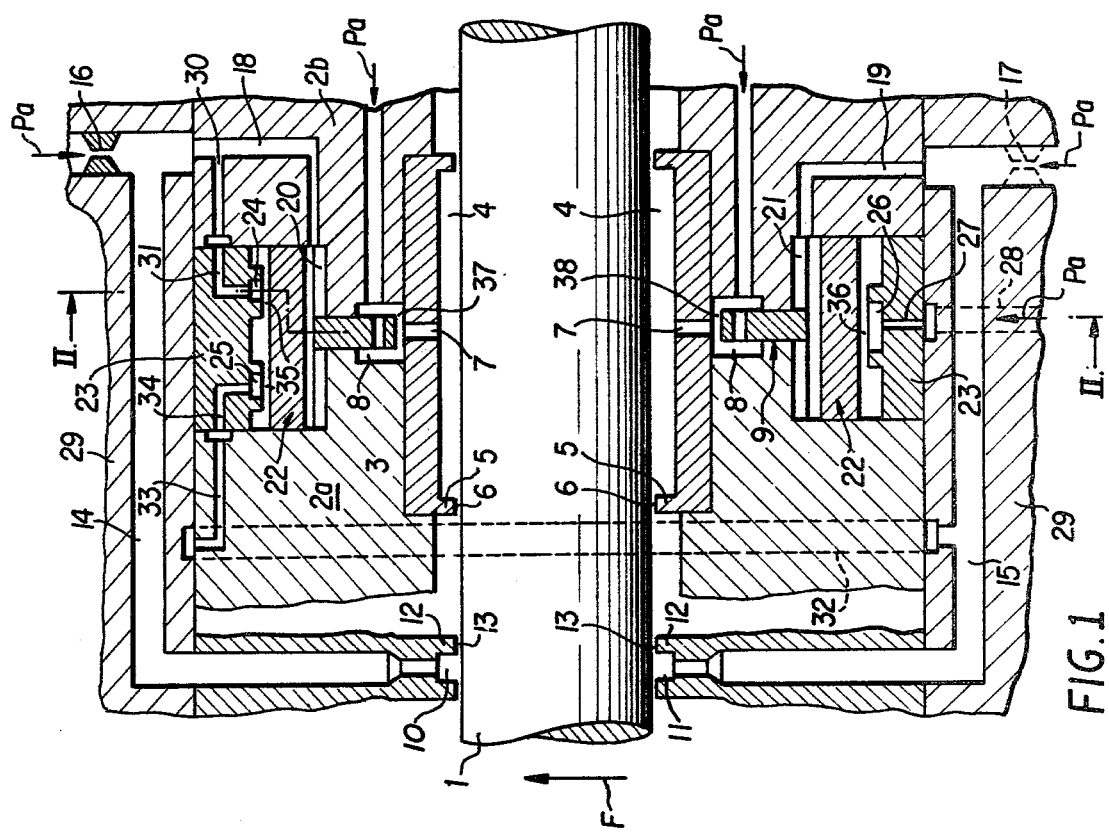
FIG. 1 is an axial cross section of the hydrostatic bearing.

Referring now to the drawings, wherein like reference numerals designate identical or corresponding parts throughout the several views, and more particularly to FIG. 1 thereof, the hydrostatic bearing illustrated, for a rotating shaft 1, consists of a bearing body in two parts 2a, 2b, receiving the supporting hydrostatic bearing proper designated by 3 in its assembly. This latter is made up of a sleeve on the inner face of which are four support chambers 4 opposed in pairs and spaced at 90°, these chambers being delimited by flanges 5 the inner radius of which being such that it permits permanent leakage around the shaft (play 6). Each chamber 4 is supplied by a radial passage 7 made in the sleeve in the form of a slot, this passage opening at its periphery into a chamber 8 supplied with liquid under pressure and formed between the two parts, 2a, 2b of the bearing body and delimited also by an annular element 9 mounted so as to slip between 2a and 2b. Each chamber 8 is connected via a passage 10 to a common manifold, not shown, with which the pressurized-liquid source is connected, this supply flow being symbolized by the arrows Pa. The inner face of the annular element 9 faces the radial passages 7 and is spaced from them so as to constitute a variable constriction in the distribution of the support-circuit liquid to the chambers 4.

The circuit for detection of the radial position of the shaft 1 comprises two opposed pairs of chambers axially displaced from the support bearing, a single pair being shown here at 10 and 11, the other being located 90° away, and these detection chambers being delimited by flanges 12 the inner radius of which is such as to permit permanent leakage around shaft 1 (play 13). These detection chambers are individually supplied, here via passages 14 and 15 for the chambers 10 and 11, and via constrictions such as 16 and 17, the supply flow to which is likewise indicated by the arrows Pa.

Downstream of each constriction such as 16 and 17 and in parallel with the supply passage 14, 15 to the corresponding detection chamber there is provided a shunt passage 18, 19 opening into a chamber 20, 21 formed between the two parts 2a, 2b of the bearing body and at the periphery of the annular distribution element 9, each of these chambers having an angular position corresponding to that of the detection chamber with which it is thus connected. The two pairs of chambers 20, 21 are likewise delimited by a second annular element 22 mounted so as to slip between the parts 2a, 2b of the bearing body.

This second annular element 22 is surrounded by a ring 23 immobilized between the parts 2a, 2b of the bearing body and it is subjected to the opposed action of liquid-throttling pressures by way of chambers formed in the inner face of the ring 23 and delimited also by flanges. These chambers consist for each axis of detection, of two chambers 24, 25 disposed along a single generatrix of the ring and respectively connected to each of the detection chambers of a single pair such as 10 and 11, as well as disposed in the same radial plane as that of the corresponding detection chambers 10 and 11. Moreover, opposite the chambers 24, 25 there is formed in the ring a chamber 26 supplied by the intermediary of a radial passage 27 of restricted cross section communicating with a passage 28 made in a sleeve 29 surrounding the ring 23 as well as the parts 2a, 2b of the bearing body, the supply to this passage 28 being from the pressure source and likewise indicated by the arrows Pa.

The chamber 24 is supplied from the passage 18 in shunt with the passage 14 for supplying the detection chamber 10 via a passage 30 in the part 2b communicating permanently with an elbow passage 31 internal to the ring 23 opening into the chamber 24. The chamber 25 is supplied by way of the passage 15 supplying detection chamber 11 via a shunt from this later comprising a semicircular passage 32 on the sleeve communicating with an elbow passage 33 internal to the part 2a which itself communicates with an elbow passage 34 internal to the ring 23 and opening into the chamber 25. The delimiting flanges of the chambers 24, 25, 26 have an inner radius such as to permit a play with variable leakage relative to the second mobile annular element 22, these plays being designated by 35 and 36 respectively in the drawing.

The operation of such a hydrostatic bearing is as follows:

In the absence of external loading of the shaft 1, the pressures developing in the support chambers 4 are found to be practically equal to one another as well as to those in the detection chambers 10 and 11, i.e. the leakage plays 6 and 13 are equal and the shaft 1 is practically centered in the bearing, the distribution constrictions denoted by 37 and 38 being practically equal, and the mobile annular assembly 9-22 in a state of equilibrium under the action of opposing forces resulting from throttling of fluid leakage from chambers 24, 25 on the one hand and 26 on the other.

Assuming now that an external force in the direction F is exerted on the shaft 1, the latter initiates a displacement tending to restrict the leakage play 13 of the detection chamber 10 and to increase that of the detection chamber 11. Consequently, the pressure of the liquid in the passage 14 and the chamber 20 in shunt goes up, while the pressure of the liquid in the passage 15 and the chamber 21 in shunt diminishes. The result is that the mobile annular assembly 9-22 also displaces in the direction F, causing an increase in the cross section of the constriction 37 and a decrease in that of the constriction 38. Consequently, the pressure of the liquid in the chamber 4 supplied via the constriction 37 increases with respect to that in the opposite chamber 4 supplied via the constriction 38, so that there is applied to the shaft 1 a force opposed to that in the direction F and increasing until balancing the latter, i.e. until the shaft 1 is brought back to its initial centered position. There is thus established a new state of equilibrium in which the pressures in the detection chambers 10, 11 become equal to one another again, and for which the position of the mobile annular assembly 9-22 is simply modified to assure the centered balancing of the shaft by differential action of the pressure in the support chambers 4.

It is readily understood that this explanation of operation for a detection axis in the direction F applies similarly to a perpendicular axis along which is disposed the other pair of chambers 10, 11 communicating with the other pair of chambers 20, 21, so that any external force on the shaft 1, whatever its direction, resolves into two components along the two detection axes considered and can be balanced by the combined action of detection pressures along these two axes on the mobile annular assembly 9-22 leading to a radial displacement of the latter in the direction of the said force and an appropriate correction of pressure in the support chamber 4.

Further, it is in order to obtain a better regulation, particularly in the dynamic regime, that there has been provided by preference the application of opposed fluid-throttling pressures on the mobile annular assembly 9-22, it being recalled that it is a matter, on the one hand, of leakage pressures of chambers 24, 25 and, on the other, of the leakage pressure of chamber 26 for each detection axis.

The presence of these opposed fluid-throttling pressures contributes to the damping of the mobile corrector assembly in the dynamic regime, and it is to be noted that apart from the normal balancing that they assure, these pressures vary in the opposing sense to the force applied to the mobile annular corrector assembly 9-22 on the basis of pressures developed in the detection chambers.

Thus, when in the example given of an external force displacing the shaft 1 in the direction F, the assembly 9-22 is likewise displaced by increase of pressure in the chamber 20, the throttling pressures in 24, 25 tend to rise and that in 26 to decrease, counter to the force applied to the assembly 9-22.

This also leads to some variation in the evolution of pressures in the detection chambers which, in the stabilized correction regime, remain equal to one another as has been pointed out, while still varying as a function of the modification of the leakage play 35 of the chambers 24 and 25 considered.

Obviously, numerous modifications and variations of the present invention are possible in light of the above teachings. It is therefore to be understood that within the scope of the appended claims, the invention may be practiced otherwise than as specifically described herein.

I claim:

1. Hydrostatic bearing for a rotating shaft comprising:
   a support circuit including opposed support chambers adapted for positioning around said shaft for receiving fluid under pressure from fluid supply passages and having a permanent leakage play with respect to said shaft,
   a circuit for detection of the radial position of said shaft in said bearing including opposed detection chambers positioned around said shaft for receiving fluid under pressure and having a permanent leakage play with respect to said shaft,
   means for servoing said shaft in position actuated by said detection circuit and acting on said support circuit, said servoing means comprising a mobile distributor element for supplying fluid to said opposed support chambers by the intermediary of constrictions varying in opposite senses on either side of an equilibrium position of said distributor element, said mobile distributor element being integral in movement with a mobile corrector element subjected to the opposed damping actions of the fluid pressure in said opposed chambers of said detection circuit, wherein said mobile distributor element is in the form of an annular element surrounding said fluid supply passages to said support chambers and forming with said passages said constrictions, said annular element being in addition subjected, at opposed zones of its periphery with angular positions corresponding to that of said detection chambers, to the pressures of the fluid prevailing in said detection chambers; and
   a fluid balancing circuit for the normal position of said shaft in said bearing, wherein:
   said mobile annular distributor element is surrounded by a second annular element constituting said mobile corrector element and forming therewith chambers connected with said detection chambers and delimiting the opposed zones, said second annular element being subjected at its periphery, and in the same angular orientation as that of said detection chambers, to the opposed action of fluid-throttling pressures which correspond, on the one hand, to detection circuit leaks and, on the other, to a leak of said fluid balancing circuit for the normal position of said shaft in said bearing.

2. Hydrostatic bearing for a rotating shaft as in claim 1 including said circuits for detection along two different radial directions, to each of which correspond, around said mobile annular distributor element, said opposed zones subjected to the pressure prevailing in said detection chambers.

3. Hydrostatic bearing for a rotating shaft as in claim 2, wherein the opposed action of the said fluid-throttling pressures on said second annular element is provided along the two radial directions of the detection circuits.

4. Hydrostatic bearing for a rotating shaft in claim 1, wherein the fluid circuits under pressure are supplied with a single fluid and from a single pressure source.

* * * * *